United States Patent
Hayano

(10) Patent No.: US 11,807,695 B2
(45) Date of Patent: Nov. 7, 2023

(54) HYDROGENATED CYCLIC POLYMER, METHOD OF PRODUCING SAME, AND RESIN COMPOSITION

(71) Applicant: ZEON CORPORATION, Tokyo (JP)

(72) Inventor: Shigetaka Hayano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/753,885

(22) PCT Filed: Sep. 24, 2020

(86) PCT No.: PCT/JP2020/036139
§ 371 (c)(1),
(2) Date: Mar. 17, 2022

(87) PCT Pub. No.: WO2021/060418
PCT Pub. Date: Apr. 1, 2021

(65) Prior Publication Data
US 2022/0372184 A1 Nov. 24, 2022

(30) Foreign Application Priority Data
Sep. 25, 2019 (JP) .................... 2019-174474

(51) Int. Cl.
*C08F 132/08* (2006.01)
*C08G 61/08* (2006.01)

(52) U.S. Cl.
CPC .................. *C08F 132/08* (2013.01)

(58) Field of Classification Search
CPC .......... C08F 132/08; C08G 2261/3324; C08G 2261/3325; C08G 2261/418; C08G 2261/724; C08G 61/08
See application file for complete search history.

(56) References Cited

U.S. PATENT DOCUMENTS

2001/0006988 A1   7/2001   Kuhnle et al.

FOREIGN PATENT DOCUMENTS

| JP | H03192116 A | 8/1991 |
| JP | H11130842 A | 5/1999 |
| JP | 2001200033 A | 7/2001 |
| JP | 2010254910 A | 11/2010 |
| JP | 2014105221 A | 6/2014 |
| WO | 2004013198 A2 | 2/2004 |
| WO | 2016036976 A1 | 3/2016 |
| WO | 2019060090 A1 | 3/2019 |
| WO | WO-2019108969 A1 * | 6/2019 ............. C07F 11/00 |

OTHER PUBLICATIONS

Stella A. Gonzales et al., Highly Tactic Cyclic Polynorbornene: Stereoselective Ring Expansion Metathesis Jolymerization (REMP) of Norbomene Catalyzed by a New Tethered Tungsten-alkylidene Catalyst, Journal of the American Chemical Society, Apr. 2016, pp. S1-S51, vol. 138, Issue 15.
Mar. 15, 2022, International Preliminary Report on Patentability issued in the International Patent Application No. PCT/JP2020/036139.
Aug. 28, 2023, the Extended European Search Report issued by the European Patent Office in corresponding European Patent Application No. 20867848.2.

* cited by examiner

*Primary Examiner* — Catherine S Branch
(74) *Attorney, Agent, or Firm* — KENJA IP LAW PC

(57) ABSTRACT

Provided is a hydrogenated product of a cyclic polymer including a cyclic chain that includes a repeating unit of a ring-opened cycloolefin.

4 Claims, No Drawings

HYDROGENATED CYCLIC POLYMER, METHOD OF PRODUCING SAME, AND RESIN COMPOSITION

TECHNICAL FIELD

The present disclosure relates to a hydrogenated cyclic polymer, a method of producing the same, and a resin composition.

BACKGROUND

Various polymer production methods that include a step of performing ring-opening metathesis polymerization of a cycloolefin monomer have been studied with the aim of obtaining polymers having industrially useful attributes. For example, Non-Patent Literature (NPL) 1 discloses a method of polymerizing norbornene by stereoselective ring expansion metathesis polymerization (REMP) as a method for producing cyclic polynorbornene with high tacticity of repeating units. As another example, Patent Literature (PTL) 1 discloses a metathesis polymerization method that includes a step of stimulating a reaction mixture comprising a cyclic unsaturated monomer and an organic initiator to provide an activated organic initiator and a step of polymerizing the cyclic unsaturated monomer via a 4-membered carbocyclic intermediate through the activated organic initiator.

CITATION LIST

Patent Literature

PTL 1: WO2016/036976A1

Non-Patent Literature

NPL 1: Stella A. Gonzales et al, "Highly Tactic Cyclic Polynorbornene: Stereoselective Ring Expansion Metathesis Polymerization (REMP) of Norbornene Catalyzed By a New Tethered Tungsten-alkylidene Catalyst", Journal of the American Chemical Society 138(15), April 2016, p. 1-51

SUMMARY

Technical Problem

In recent years, there has been a need for polymers having novel structures. Accordingly, one object of the present disclosure is to provide a hydrogenated cyclic polymer having a novel structure that has not existed up until now. Another object of the present disclosure is to provide a resin composition that contains this hydrogenated cyclic polymer having a novel structure.

Solution to Problem

The inventor conducted diligent investigation with the aim of solving the problem set forth above. The inventor discovered that by performing ring-opening polymerization of a cycloolefin monomer and then hydrogenating the ring-opening polymerization product that is obtained, it is possible to create a novel structure that has not existed up until now, and, in this manner, completed the present disclosure.

Specifically, the present disclosure aims to advantageously solve the problem set forth above, and a presently disclosed hydrogenated cyclic polymer is a hydrogenated product of a cyclic polymer comprising a cyclic chain including a repeating unit of a ring-opened cycloolefin. Such a hydrogenated cyclic polymer has a novel structure.

Note that the structure of a hydrogenated cyclic polymer can be analyzed by a method described in the EXAMPLES section of the present specification.

In the presently disclosed hydrogenated cyclic polymer, the cyclic chain of the cyclic polymer preferably includes an ether bond.

Moreover, the present disclosure aims to advantageously solve the problem set forth above, and a presently disclosed method of producing a hydrogenated cyclic polymer comprises: a ring-opening polymerization step of performing ring-opening polymerization of at least one cycloolefin monomer in the presence of a cyclic vinyl ether compound to obtain a cyclic polymer including a cyclic chain that includes a repeating unit of a ring-opened cycloolefin; and a hydrogenation step of hydrogenating the cyclic polymer to obtain a hydrogenated product of the cyclic polymer. This production method enables efficient production of the presently disclosed hydrogenated cyclic polymer.

In the presently disclosed method of producing a hydrogenated cyclic polymer, the cyclic chain of the cyclic polymer obtained in the ring-opening polymerization step preferably includes an ether bond.

Furthermore, the present disclosure aims to advantageously solve the problem set forth above, and a presently disclosed resin composition comprises any one of the hydrogenated cyclic polymers set forth above.

Advantageous Effect

According to the present disclosure, it is possible to provide a hydrogenated cyclic polymer having a novel structure. Moreover, according to the present disclosure, it is possible to provide a resin composition that contains this hydrogenated cyclic polymer having a novel structure.

DETAILED DESCRIPTION

The following provides a detailed description of embodiments of the present disclosure.

The presently disclosed hydrogenated cyclic polymer is a polymer that can be used as a constituent resin material of various shaped products in a wide range of fields. Moreover, the presently disclosed hydrogenated cyclic polymer can suitably be used as a constituent material of the presently disclosed resin composition. Furthermore, the presently disclosed hydrogenated cyclic polymer can be efficiently produced in accordance with the presently disclosed method of producing a hydrogenated cyclic polymer.

(Hydrogenated Cyclic Polymer)

The presently disclosed hydrogenated cyclic polymer is a hydrogenated product of a cyclic polymer that includes a cyclic chain including a repeating unit of a ring-opened cycloolefin. Note that the term "cyclic chain" as used in the present specification indicates a state in which a polymer chain with two or more repeating unit has a cyclic structure. The present cyclic polymer may possess side chain as a branch of cyclic main chain. In the presently disclosed hydrogenated cyclic polymer, at least some carbon-carbon double bonds among those included in the cyclic chain and the side chain of the cyclic polymer have been hydrogenated.

<Cyclic Chain>

The cyclic chain includes a repeating unit of a ring-opened cycloolefin as previously described. More specifically, the cyclic chain preferably only includes a ring-opened cycloolefin as a repeating unit.

<<Ring-Opened Cycloolefin>>

Examples of cycloolefin monomers that can be used to form the ring-opened cycloolefin include, but are not specifically limited to, monomers having a norbornene structure (hereinafter, referred to as "norbornene-based monomers") and monocyclic cycloalkene monomers. One monomer may be used individually, or two or more monomers may be used in combination.

—Norbornene-Based Monomers—

Examples of norbornene-based monomers include norbornene, norbornene-based monomers that do not have a ring that condenses with a norbornene ring (hereinafter, also referred to as "condensed ring-non-forming norbornene-based monomers"), and norbornene-based monomers that do have a ring that condenses with a norbornene ring (hereinafter, also referred to as "condensed ring-forming norbornene-based monomers").

Examples of condensed ring-non-forming norbornene-based monomers include norbornenes that include an alkyl group such as 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes that include an alkenyl group such as 5-ethylidenenorbornene, 5-vinylnorbornene, 5-propenylnorbornene, 5-cyclohexenylnorbornene, and 5-cyclopentenylnorbornene; norbornenes that include an aromatic ring such as 5-phenylnorbornene; norbornenes that include a polar group including an oxygen atom such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxyisopropylnorbornene, 5,6-dicarboxynorbornene, and 5-methoxycarbonyl-6-carboxynorbornene; and norbornenes that include a polar group including a nitrogen atom such as 5-cyanonorbornene. One of these monomers may be used individually, or two or more of these monomers may be used in combination.

Examples of condensed ring-forming norbornene-based monomers include monomers indicated by formula (I) and formula (II), shown below.

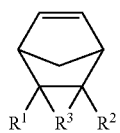

(I)

In formula (I), $R^1$ and $R^2$ each represent, independently of each other, a hydrogen atom, a halogen atom, an optionally substituted hydrocarbon group having a carbon number of not less than 1 and not more than 20, or a substituent including a silicon atom, an oxygen atom, or a nitrogen atom (excluding those corresponding to an optionally substituted hydrocarbon group having a carbon number of not less than 1 and not more than 20), and may be bonded to each other to form a ring. $R^3$ is an optionally substituted divalent hydrocarbon group having a carbon number of not less than 1 and not more than 20.

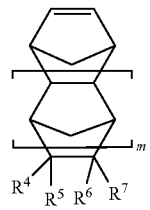

(II)

In formula (II), $R^4$, $R^5$, $R^6$, and $R^7$ each represent, independently of one another, a hydrogen atom, a halogen atom, an optionally substituted hydrocarbon group having a carbon number of not less than 1 and not more than 20, or a substituent including a silicon atom, an oxygen atom, or a nitrogen atom (excluding those corresponding to an optionally substituted hydrocarbon group having a carbon number of not less than 1 and not more than 20), and $R^4$ and $R^6$ may be bonded to each other to form a ring. Moreover, m is 1 or 2.

Examples of monomers indicated by the preceding formula (I) include dicyclopentadiene, methyldicyclopentadiene, dimethyldicyclopentadiene, tricyclo[5.2.1.0$^{2,6}$]dec-8-ene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), and tetracyclo[10.2.1.0$^{2,11}$.0$^{4,9}$]pentadeca-4,6,8,13-tetraene (also referred to as 1,4-methano-1,4,4a,9,9a,10-hexahydroanthracene). One of these monomers may be used individually, or two or more of these monomers may be used in combination.

Examples of monomers indicated by the preceding formula (II) include tetracyclododecenes for which m is 1 and hexacycloheptadecenes for which m is 2.

Examples of tetracyclododecenes (m=1) include tetracyclododecene; tetracyclododecenes that include an alkyl group such as 8-methyltetracyclododecene, 8-ethyltetracyclododecene, 8-cyclohexyltetracyclododecene, and 8-cyclopentyltetracyclododecene; tetracyclododecenes that include a double bond outside of a ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes that include an aromatic ring such as 8-phenyltetracyclododecene; tetracyclododecenes that include a substituent including an oxygen atom such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; tetracyclododecenes that include a substituent including a nitrogen atom such as 8-cyanotetracyclododecene and tetracyclododecene-8,9-dicarboxylic acid imide; tetracyclododecenes that include a substituent including a halogen atom such as 8-chlorotetracyclododecene; and tetracyclododecenes that include a substituent including a silicon atom such as 8-trimethoxysilyltetracyclododecene. One of these tetracyclododecenes may be used individually, or two or more of these tetracyclododecenes may be used in combination.

Examples of hexacycloheptadecenes (m=2) include hexacycloheptadecene; hexacycloheptadecenes that include an alkyl group such as 12-methylhexacycloheptadecene, 12-ethylhexacycloheptadecene, 12-cyclohexylhexacycloheptadecene, and 12-cyclopentylhexacycloheptadecene; hexacycloheptadecenes that include a double bond outside of a ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes that include an aromatic ring such as 12-phenylhexacycloheptadecene; hexacycloheptadecenes that include a substituent including an oxygen atom such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic acid anhydride; hexacycloheptadecenes that include a substituent including a nitrogen atom such as 12-cyanohexacycloheptadecene and hexacycloheptadecene-12,13-dicarboxylic acid imide; hexacycloheptadecenes that include a substituent including a halogen atom such as 12-chlorohexacycloheptadecene; and hexacycloheptadecenes that include a substituent including a silicon atom such as 12-trimethoxysilylhexacycloheptadecene.

Of these examples, norbornene, dicyclopentadiene, and tetracyclododecene are preferable as norbornene-based monomers.

—Monocyclic Cycloalkene Monomers—

Examples of monocyclic cycloalkene monomers that may be used include cyclopentene, cyclohexene, and cycloheptene. Of these examples, cyclopentene is preferable as a monocyclic cycloalkene monomer.

The cyclic chain of the presently disclosed hydrogenated cyclic polymer preferably includes an ether bond. More specifically, it is preferable that the cyclic chain includes one ether bond.

<Hydrogenation Ratio>

The hydrogenation ratio of the presently disclosed hydrogenated cyclic polymer (i.e., the proportion of carbon-carbon double bonds that have been hydrogenated relative to all carbon-carbon double bonds that were included in the cyclic polymer that is a precursor) is normally 90% or more, preferably 95% or more, and more preferably 99% or more. Note that the hydrogenation ratio (mole basis) of a hydrogenated cyclic polymer can be determined by $^1$H-NMR measurement.

Moreover, the hydrogenation ratio of the hydrogenated cyclic polymer can be adjusted by altering the conditions of the hydrogenation reaction, for example.

<Weight-Average Molecular Weight>

The weight-average molecular weight of the presently disclosed hydrogenated cyclic polymer is preferably 3,000 or more, and more preferably 5,000 or more, and is preferably 1,000,000 or less, and more preferably 500,000 or less.

Note that the weight-average molecular weight of the hydrogenated cyclic polymer can be adjusted by altering the production method of the hydrogenated cyclic polymer. For example, the weight-average molecular weight can be adjusted by altering the type and/or amount of a cyclic vinyl ether compound, catalyst, or the like that is added in production of the cyclic polymer that is a precursor of the hydrogenated cyclic polymer.

<Metal Content>

The metal content in the presently disclosed hydrogenated cyclic polymer is preferably 10 ppm or less, and more preferably 5 ppm or less based on the total mass of the hydrogenated cyclic polymer. The metal may be one or more selected from the group consisting of Ru, Mo, W, and Ni. Note that in a case in which the hydrogenated cyclic polymer contains a plurality of types of metals, the total content thereof is preferably not more than any of the upper limits set forth above. Note that these metals may originate from a catalyst component or the like that is optionally used in synthesis of the cyclic polymer that is a precursor of the hydrogenated cyclic polymer and/or in hydrogenation of the cyclic polymer, and may remain in the hydrogenated cyclic polymer. When the metal content in the presently disclosed hydrogenated cyclic polymer is not more than any of the upper limits set forth above, high transparency can be achieved. Note that the metal content in a hydrogenated cyclic polymer can be determined by ICP (Inductively Coupled Plasma) optical emission spectroscopy.

(Production Method of Hydrogenated Cyclic Polymer)

The presently disclosed method of producing a hydrogenated cyclic polymer includes: a ring-opening polymerization step of performing ring-opening polymerization of at least one cycloolefin monomer in the presence of a cyclic vinyl ether compound to obtain a cyclic polymer including a cyclic chain that includes a repeating unit of a ring-opened cycloolefin; and a hydrogenation step of hydrogenating the cyclic polymer to obtain a hydrogenated product of the cyclic polymer. This production method enables efficient production of the presently disclosed hydrogenated cyclic polymer set forth above. Note that after treatment may be performed after the hydrogenation step as necessary.

<Ring-Opening Polymerization Step>

In the ring-opening polymerization step, ring-opening polymerization of at least one cycloolefin monomer is performed in the presence of a cyclic vinyl ether compound to obtain a cyclic polymer including a cyclic chain that includes a repeating unit of a ring-opened cycloolefin. More specifically, ring-opening polymerization of a monomer composition that contains at least one of the previously described cycloolefin monomers is performed in the presence of a cyclic vinyl ether compound. Note that a catalyst may be added to the polymerization system in the ring-opening polymerization step. Also note that the ring-opening polymerization step may be performed in the absence or presence of a solvent.

<<Cyclic Vinyl Ether>>

The cyclic vinyl ether compound is a component that can function as a polymerization initiator in the ring-opening polymerization step. The cyclic vinyl ether compound may be a compound represented by the following general formula (X).

In general formula (X), a ring structure is formed by R with R' or by one of R' and R'' with R'''. R to R''' in general formula (X) may each, independently of one another, be a substituted or unsubstituted alkyl group having a carbon number of 12 or less, a trialkylsilyl group (with a proviso that the alkyl groups are each, independently of one another, an alkyl group having a carbon number of 3 or less), or a substituted or unsubstituted alkoxy group having a carbon number of 12 or less.

Specific examples of cyclic vinyl ether compounds that can be used include 2,3-dihydrofuran and derivatives thereof, 3,4-dihydro-2H-pyran and derivatives thereof, 1-(trimethylsilyloxy)cyclohexene and derivatives thereof, 1-(trimethylsilyloxy)cyclopentene and derivatives thereof, 1-methoxycyclooctene and derivatives thereof, and 2,3,4,5- tetrahydrooxepine and derivatives thereof. Of these examples, 3,4-dihydro-2-methoxy-2H-pyran and 3,4-dihydro-2-ethoxy-2H-pyran, which are derivatives of 3,4-dihydro-2H-pyran, are preferable from a viewpoint of increasing the yield.

<<Catalyst>>

A photoredox catalyst can suitably be used as a catalyst that can be added to the polymerization system in the ring-opening polymerization step. A photoredox catalyst is a compound that can generate a radical species upon irradiation with ultraviolet/visible region light such as visible light having a wavelength of 425 nm, for example. Examples of photoredox catalysts that can suitably be used in the ring-opening polymerization step include pyrylium salts and acridinium salts such as described in WO2016/036976A1, for example. In particular, a pyrylium salt can suitably be used as a photoredox catalyst in the ring-opening polymerization step. The pyrylium salt may be a pyrylium salt represented by the following formula (III).

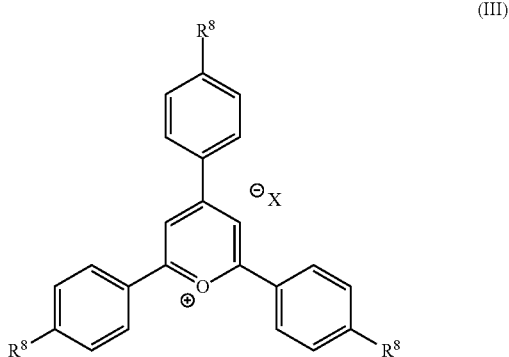

(III)

In formula (III), each $R^8$ indicates, independently of one another, hydrogen, an alkyl group having a carbon number of 1 to 6, an alkoxy group having a carbon number of 1 to 6, or an aryl group, and $X^-$ indicates a monovalent anion. Note that the alkyl group having a carbon number of 1 to 6, the alkoxy group having a carbon number of 1 to 6, and the aryl group are optionally substituted.

In particular, it is preferable that every $R^8$ is a methoxy group and that $X^-$ is $BF_4^-$. In other words, the pyrylium salt represented by formula (III) is preferably 2,4,6-tris(4-methoxyphenyl)pyrylium tetrafluoroborate.

It is preferable that the catalyst used in the ring-opening polymerization step does not include a metal.

<<Solvent>>

The ring-opening polymerization step is preferably performed in a solvent from a viewpoint of enabling good reaction control, and, in particular, is preferably performed in an organic solvent.

No specific limitations are placed on the organic solvent that is used so long as it enables dissolution or dispersion of the obtained cyclic polymer and is inert in the polymerization reaction. Specific examples include aliphatic hydrocarbon solvents such as pentane, hexane, and heptane; alicyclic hydrocarbon solvents such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbon solvents such as benzene, toluene, and xylene (o-xylene, m-xylene, and p-xylene); halogenated aliphatic hydrocarbon solvents such as dichloromethane, chloroform, 1,2-dichloroethane, and 1,1,2,2-tetrachloroethane; halogenated aromatic hydrocarbon solvents such as chlorobenzene and dichlorobenzene; nitrogen-containing hydrocarbon solvents such as nitromethane, nitrobenzene, and acetonitrile; ether solvents such as diethyl ether and tetrahydrofuran; and aromatic ether solvents such as anisole and phenetole. One solvent may be used individually, or two or more solvents may be used in combination. It is particularly preferable to use a halogenated aliphatic hydrocarbon solvent as the solvent.

Note that the conditions of ring-opening polymerization (used amounts of components described above, polymerization time, polymerization temperature, etc.) can, without any specific limitations, be set as appropriate depending on the desired physical properties of the cyclic polymer and the hydrogenated cyclic polymer. Moreover, although the cyclic polymer obtained through the ring-opening polymerization step may be collected from the reaction solution and then subjected to the hydrogenation reaction, it is also possible to subject the reaction solution containing the cyclic polymer to the hydrogenation step in that form.

<<Ring-Opening Polymerization Scheme>>

As one example, the ring-opening polymerization reaction is presumed to progress according to the following scheme in a case in which a photoredox catalyst is used as a catalyst and 3,4-dihydro-2H-pyran is used as a vinyl ether compound that serves as a polymerization initiator.

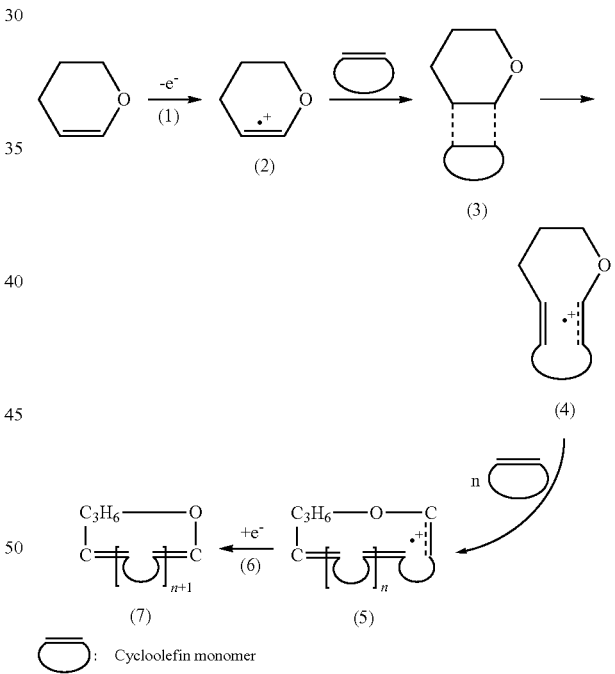

First, a photoredox catalyst such as the previously described pyrylium salt is excited through photoirradiation to place the photoredox catalyst in a state in which it can function as an electron oxidant (not illustrated in scheme). Next, 3,4-dihydro-2H-pyran undergoes one-electron oxidation ((1) of scheme) through the electron oxidant to form a radical cation ((2) of scheme). A 4-membered ring structure is then formed between the radical cation and a cycloolefin monomer present in the polymerization system, thereby producing a radical cation intermediate ((3) of scheme). The radical cation intermediate (3) that is produced in this manner then undergoes a ring-opening metathesis reaction, and the resultant intermediate forms a further radical cation ((4) of scheme). This further radical cation (4) sequentially reacts with n molecules of the cycloolefin monomer present in the polymerization system ((5) of scheme), thereby causing extension of a cyclic chain of a cyclic polymer. When photoirradiation is stopped in order to terminate the polymerization reaction, the radical cation undergoes one-electron reduction ((6) of scheme). A ring-opening polymerization reaction such as described above yields a cyclic polymer having one vinyl ether bond derived from 3,4-dihydro-2H-pyran serving as a polymerization initiator included in a cyclic chain ((7) of scheme).

<<Hydrogenation Step>>

In the hydrogenation step, the cyclic polymer that has been obtained through the ring-opening polymerization step described above is hydrogenated to obtain a hydrogenated product of the cyclic polymer. More specifically, the hydrogenation step involves hydrogenating at least some carbon-carbon double bonds among carbon-carbon double bonds in the cyclic chain of the cyclic polymer, and also among other carbon-carbon double bonds in a case in which the cyclic polymer includes carbon-carbon double bonds other than in the cyclic chain. Note that in the hydrogenation step, the hydrogenation ratio (mole basis) in the resultant hydrogenated product may preferably be adjusted to 90% or more, may preferably be adjusted to 95% or more, or may preferably be adjusted 99% or more. Moreover, in a case in which a carbon-carbon double bond of a vinyl ether bond that is derived from the polymerization initiator and is included in the cyclic polymer obtained through the ring-opening polymerization step described above is hydrogenated in the hydrogenation step, this means that the resultant hydrogenated product includes a structural unit including an ether bond represented by: —C—O—C—.

In the hydrogenation step, hydrogenation of carbon-carbon double bonds present in the cyclic polymer can, without any specific limitations, be performed by: (a) adding a hydrogenating agent to the system containing the cyclic polymer obtained by the previously described step and then performing heating to cause a reaction thereof (transfer hydrogenation reaction); or (b) adding a hydrogenation catalyst to the system and then adding hydrogen and causing a reaction thereof (catalytic hydrogenation reaction).

The hydrogenating agent used in the (a) transfer hydrogenation reaction described above may be any hydrogenating agent without any specific limitations so long as it is a hydrogenating agent that enables hydrogenation of carbon-carbon double bonds present in the cyclic polymer. For example, hydrazine or p-toluenesulfonyl hydrazide may be used.

Moreover, any hydrogenation catalyst that is typically used in a hydrogenation reaction of an olefin compound can be used without any specific limitations as the hydrogenation catalyst used in the (b) catalytic hydrogenation reaction described above. Examples include Ziegler catalysts that are a combination of a transition metal compound and an alkali metal compound such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, or a combination of tetrabutoxytitanate and dimethylmagnesium; noble metal complex catalysts formed of dichlorotris(triphenylphosphine) rhodium or a ruthenium compound such as RuHCl(CO)(PPh$_3$)$_3$, RuHCl(CO)[P(p-Me-Ph)$_3$]$_3$, RuHCl(CO)(PCy$_3$)$_2$, RuHCl(CO)[P(n-Bu)$_3$]$_3$, RuHCl(CO)[P(i-Pr)$_3$]$_2$, RuH$_2$(CO)(PPh$_3$)$_3$, RuH$_2$(CO)[P(p-Me-Ph)$_3$]$_3$, RuH$_2$(CO)(PCy$_3$)$_3$, RuH$_2$(CO)[P(n-Bu)$_3$]$_3$, RuH(OCOCH$_3$)(CO)(PPh$_3$)$_2$, RuH(OCOPh)(CO)(PPh$_3$)$_2$, RuH(OCOPh-CH$_3$)(CO)(PPh$_3$)$_2$, RuH(OCOPh-OCH$_3$)(CO)(PPh$_3$)$_2$, and RuH(OCOPh)(CO)(PCy$_3$)$_2$; other such homogeneous catalysts; and supported heterogeneous catalysts in which a metal such as nickel, palladium, platinum, rhodium, or ruthenium is supported on a support such as carbon, silica, diatomaceous earth, alumina, or titanium oxide.

One hydrogenation catalyst may be used individually, or two or more hydrogenation catalysts may be used in combination. A supported heterogeneous catalyst is preferably used as the hydrogenation catalyst because this makes it possible to easily remove the hydrogenation catalyst from the reaction solution by filtration after the hydrogenation reaction.

The supported heterogeneous catalyst is, more specifically, preferably a combination such as nickel/silica, nickel/diatomaceous earth, nickel/alumina, palladium/carbon, palladium/silica, palladium/diatomaceous earth, or palladium/alumina.

<<Conditions of Hydrogenation Step>>

The conditions of the hydrogenation reaction (used amount of hydrogenating agent or hydrogenation catalyst, reaction time, reaction temperature, hydrogen pressure when performing catalytic hydrogenation reaction according to (b), etc.) can be set as appropriate depending on the desired physical properties (for example, hydrogenation ratio) of the hydrogenated cyclic polymer without any specific limitations.

The solvent in the hydrogenation step is not specifically limited and can be any of the solvents listed as solvents (particularly organic solvents) that can be used in the previously described ring-opening polymerization step, for example.

<After Treatment Step>

The ring-opening polymerization step and hydrogenation step described above may be followed by an after treatment step if necessary. In the after treatment step, the objective hydrogenated cyclic polymer can be isolated well by subjecting the reaction solution containing the hydrogenated cyclic polymer that has been obtained through the hydrogenation step to reprecipitation drying or direct drying using a thin-film dryer or the like, for example. Note that the hydrogenated cyclic polymer can normally be obtained as a solid having a powder or pellet form.

(Resin Composition)

The presently disclosed resin composition contains the presently disclosed hydrogenated cyclic polymer set forth above and can optionally contain known additives. As a result of containing the presently disclosed hydrogenated cyclic polymer, the presently disclosed resin composition can advantageously be used as a material of a shaped product.

Examples of known additives that can be used include, but are not specifically limited to, polymers (thermoplastic elastomers, etc.) other than the presently disclosed hydrogenated cyclic polymer, fillers, antioxidants, mold release agents, flame retardants, antibacterial agents, wood flour, coupling agents, plasticizers, colorants, lubricants, silicon oil, foaming agents, surfactants, light stabilizers, dispersion aids, heat stabilizers, ultraviolet absorbers, antistatic agents, dispersants, chlorine scavengers, crystallization nucleating agents, antifogging agents, organic fillers, neutralizers, decomposers, metal deactivators, and antifouling agents. One of these additives may be used individually, or two or more of these additives may be used in combination.

No specific limitations are placed on the method by which the resin composition is produced. For example, a method in which the hydrogenated cyclic polymer and additives that are added as necessary are kneaded to obtain a resin composition in a pellet form or a method in which the hydrogenated cyclic polymer and additives that are added as necessary are mixed in an appropriate solvent and then the solvent is removed to obtain a resin composition may be adopted.

EXAMPLES

The following provides a more specific description of the present disclosure through examples. However, the present disclosure is not limited to these examples. In the following description, "%" and "parts" used in expressing quantities are by mass, unless otherwise specified.

In the examples and comparative example, the following methods were used to measure the hydrogenation ratio and weight-average molecular weight of obtained products. Moreover, analysis of products obtained in the examples and comparative example and measurement of metal content were performed as described below.

<Weight-Average Molecular Weight>

The weight-average molecular weight of a hydrogenated cyclic polymer was measured as a standard polystyrene-equivalent value by gel permeation chromatography (GPC) using tetrahydrofuran as an eluent. An HLC8320GPC (produced by Tosoh Corporation) was used as a measurement apparatus.

A sample was prepared by dissolving a measurement sample in tetrahydrofuran at room temperature such that the sample concentration was 1 mg/mL.

Measurement was performed under conditions of a flow rate of 0.35 mL/min, a sample injection volume of 50 μL, and a column temperature of 40° C. using four TSKgel SuperMultiporeHZ-H columns (produced by Tosoh Corporation) connected in series as a column.

<Hydrogenation Ratio>

Hydrogenation ratio was calculated based on $^1$H-NMR measurement. More specifically, a ring-opened polymer obtained through a ring-opening polymerization step and a hydrogenated ring-opened polymer obtained through a hydrogenation step were each measured by $^1$H-NMR, the carbon-carbon double bond content (mole basis) in each of these ring-opened polymers was determined, and then a proportion (%) of the carbon-carbon double bond content in the hydrogenated ring-opened polymer was calculated taking the carbon-carbon double bond content in the ring-opened polymer to be 100%.

<Product Analysis>

First, an obtained ring-opened polymer was used as a measurement sample to perform $^1$H-NMR measurement. This measurement was performed to judge whether the measurement sample had a structure including a ring-opened cycloolefin as a repeating unit and also including a vinyl ether moiety. Next, the absolute molecular weight of the measurement sample was measured in a time of flight-mass spectrometer (MALDI-TOF-MS: Matrix Assisted Laser Desorption/Ionization-Time of Flight-Mass Spectrometer), and the measurement sample was identified to be a cyclic polymer in a case in which mass peaks for polymer chains included in the measurement sample were confirmed to each have a molecular weight equal to: (multiple of molecular weight of repeating unit)+(molecular weight of polymerization initiator).

Next, a hydrogenated ring-opened polymer obtained through hydrogenation of the ring-opened polymer was used as a measurement sample to perform $^1$H-NMR measurement. This measurement was performed to judge whether the measurement sample had a structure including a hydrogenated ring-opened cycloolefin as a repeating unit and also including an ether moiety. Next, the absolute molecular weight of the measurement sample was measured in a time of flight-mass spectrometer, and the measurement sample was identified to be a cyclic polymer in a case in which mass peaks for polymer chains included in the measurement sample were confirmed to each have a molecular weight equal to: (multiple of molecular weight of hydrogenated product of repeating unit)+(molecular weight of hydrogenated product of polymerization initiator).

Note that in the case of Example 5 in which a comparatively high molecular weight polymer was obtained, it was confirmed that a cyclic polymer had been obtained by performing analysis by GPC-MALLS (Gel Permeation Chromatography-Multiangle Laser Light Scattering) in addition to the analysis described above.

<Metal Content in Product>

When a hydrogenated cyclic polymer obtained in each example was used as a measurement sample to determine the total content (ppm; based on mass of hydrogenated product) of Ru, Mo, W, and Ni by ICP (Inductively Coupled Plasma) optical emission spectroscopy, the total content was confirmed to be 5 ppm or less in each of the examples.

Example 1

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 34.6 mg of 3,4-dihydro-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, so as to cause reprecipitation of aggregates, and agglomerated material containing the ring-opened polymer was filtered off. The filtration cake was washed with methanol and was subsequently dried under reduced pressure at 40° C. for 24 hours. The yield of the obtained ring-opened polymer was 0.01 g. The weight-average molecular weight of the obtained ring-opened polymer, which was measured as previously described, was 9,100. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+

(molecular weight of 3,4-dihydro-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was reprecipitated, then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2H-pyran serving as a polymerization initiator had been hydrogenated and an ether moiety of the 3,4-dihydro-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 3,4-dihydro-2H-pyran serving as polymerization initiator). Through these results, the hydrogenated ring-opened polymer obtained in this step was confirmed to be a cyclic polymer.

Example 2

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 36.1 mg of 2,3-dihydrofuran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.01 g. The weight-average molecular weight of the obtained ring-opened polymer, which was measured as previously described, was 10,200. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 2,3-dihydrofuran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 2,3-dihydrofuran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 2,3-dihydrofuran serving as a polymerization initiator had been hydrogenated and an ether moiety of the 2,3-dihydrofuran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 2,3-dihydrofuran serving as polymerization initiator). Through these results, the hydrogenated ring-opened polymer obtained in this step was confirmed to be a cyclic polymer.

Example 3

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 35.2 mg of 3,4-dihydro-2-methoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.25 g. The weight-average molecular weight of the obtained ring-opened polymer, which was measured as previously described, was 14,700. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-methoxy-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 3,4-dihydro-2-methoxy-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-methoxy-2H-pyran serving as a polymerization initiator had been hydrogenated and an ether moiety of the 3,4-dihydro-2-methoxy-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 3,4-dihydro-2-methoxy-2H-pyran serving as polymerization initiator). Through these results, the hydrogenated ring-opened polymer obtained in this step was confirmed to be a cyclic polymer.

Example 4

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 32.9 mg of 3,4-dihydro-2-ethoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.36 g. The weight-average molecular weight of the obtained ring-opened polymer, which was measured as previously described, was 10,600. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-ethoxy-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 3,4-dihydro-2-ethoxy-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-ethoxy-2H-pyran serving as a polymerization initiator had been hydrogenated and an ether moiety of the 3,4-dihydro-2-ethoxy-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 3,4-dihydro-2-ethoxy-2H-pyran serving as polymerization initiator). Through these results, the hydrogenated ring-opened polymer obtained in this step was confirmed to be a cyclic polymer.

Example 5

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 1.65 mg of 3,4-dihydro-2-ethoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.36 g. The weight-average molecular weight of the obtained ring-opened polymer, which was measured as previously described, was 113,000. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-ethoxy-2H-pyran serving as a polymerization initiator was retained in the ring-opened polymer. Next, the obtained ring-opened polymer was compared to linear polynorbornene by GPC-MALLS and was confirmed to be cyclic. Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-ethoxy-2H-pyran serving as a polymerization initiator had been hydrogenated and an ether moiety of the 3,4-dihydro-2-ethoxy-2H-pyran was retained in the hydrogenated ring-opened polymer. Next, the obtained hydrogenated ring-opened polymer was compared to hydrogenated linear polynorbornene by GPC-MALLS and was confirmed to be cyclic. Through these results, the hydrogenated ring-opened polymer obtained in this step was confirmed to be a cyclic polymer.

Example 6

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 3.9 mg of 1-(trimethylsilyloxy)cyclohexene, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.28 g. The weight-average molecular weight of the obtained ring-opened polymer, which was measured as previously described, was 13,200. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 1-(trimethylsilyloxy)cyclohexene serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 1-(trimethylsilyloxy)cyclohexene serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 1-(trimethylsilyloxy)cyclohexene serving as a polymerization initiator had been hydrogenated and an ether moiety of the 1-(trimethylsilyloxy)cyclohexene was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 1-(trimethylsilyloxy) cyclohexene serving as polymerization initiator). Through these results, the hydrogenated ring-opened polymer obtained in this step was confirmed to be a cyclic polymer.

Example 7

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 3.5 mg of 1-(trimethylsilyloxy) cyclopentene, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.41 g. The weight-average molecular weight of the obtained ring-opened polymer, which was measured as previously described, was 11,000. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 1-(trimethylsilyloxy)cyclopentene serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 1-(trimethylsilyloxy)cyclopentene serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 1-(trimethylsilyloxy)cyclopentene serving as a polymerization initiator had been hydrogenated and an ether moiety of the 1-(trimethylsilyloxy)cyclopentene was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 1-(trimethylsilyloxy) cyclopentene serving as polymerization initiator). Through these results, the hydrogenated ring-opened polymer obtained in this step was confirmed to be a cyclic polymer.

Example 8

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 3.2 mg of 1-(methoxy)cyclooctene, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.75 g. The weight-average molecular weight of the obtained ring-opened polymer, which was measured as previously described, was 9,400. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 1-(methoxy)cyclooctene serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 1-(methoxy)cyclooctene serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 1-(methoxy)cyclooctene serving as a polymerization initiator had been hydrogenated and an ether moiety of the 1-(methoxy)cyclooctene was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 1-(methoxy)cyclooctene serving as polymerization initiator). Through these results, the hydrogenated ring-opened polymer obtained in this step was confirmed to be a cyclic polymer.

Example 9

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of norbornene as a cycloolefin monomer dissolved in 1.75 g of dichloromethane as a solvent was then added and stirred. Next, 2.2 mg of 2,3,4,5-tetrahydrooxepine, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.75 g. The weight-average molecular weight of the obtained ring-opened polymer, which was measured as previously described, was 9,400. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 2,3,4,5-tetrahydrooxepine serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of 2,3,4,5-tetrahydrooxepine serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 2,3,4,5-tetrahydrooxepine serving as a polymerization initiator had been hydrogenated and an ether moiety of the 2,3,4,5-tetrahydrooxepine was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of norbornene serving as cycloolefin monomer)+(molecular weight of hydrogenated product of 2,3,4,5-tetrahydrooxepine serving as polymerization initiator). Through these results, the hydrogenated ring-opened polymer obtained in this step was confirmed to be a cyclic polymer.

Example 10

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of dicyclopentadiene as a cycloolefin monomer dissolved in 1.75 g of dichloromethane as a solvent was then added and stirred. Next, 32.9 mg of 3,4-dihydro-2-ethoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.36 g. The weight-average molecular weight of the obtained ring-opened polymer, which was measured as previously described, was 4,300. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-ethoxy-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of dicyclopentadiene serving as cycloolefin monomer)+(molecular weight of 3,4-dihydro-2-ethoxy-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-ethoxy-2H-pyran serving as a polymerization initiator had been hydrogenated and an ether moiety of the 3,4-dihydro-2-ethoxy-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of dicyclopentadiene serving as cycloolefin monomer)+(molecular weight of hydrogenated product of 3,4-dihydro-2-ethoxy-2H-pyran serving as polymerization initiator). Through these results, the hydrogenated ring-opened polymer obtained in this step was confirmed to be a cyclic polymer.

Example 11

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.0 g of norbornene and 0.75 g of dicyclopentadiene as cycloolefin monomers dissolved in 1.75 g of dichloromethane as a solvent was then added and stirred. Next, 32.9 mg of 3,4-dihydro-2-ethoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.36 g. The weight-average molecular weight of the obtained ring-opened polymer, which was measured as previously described, was 5,900. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-ethoxy-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (sum of multiple of molecular weight of norbornene serving as cycloolefin monomer and multiple of molecular weight of dicyclopentadiene serving as cycloolefin monomer)+(molecular weight of 3,4-dihydro-2-ethoxy-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-ethoxy-2H-pyran serving as a polymerization initiator had been hydrogenated and an ether moiety of the 3,4-dihydro-2-ethoxy-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (sum of multiple of molecular weight of hydrogenated product of norbornene and multiple of molecular weight of hydrogenated product of dicyclopentadiene)+(molecular weight of hydrogenated product of 3,4-dihydro-2-ethoxy-2H-pyran serving as polymerization initiator). Through these results, the hydrogenated ring-opened polymer obtained in this step was confirmed to be a cyclic polymer.

Example 12

<Ring-Opening Polymerization Step>

A glass reactor equipped with a stirrer was charged with 5 mg of 2,4,6-tris(4-methoxyphenyl)pyrylium tetrafluoroborate, which is a pyrylium salt, as a photoredox catalyst and 5 mL of dichloromethane as a solvent, and was stirred. A solution of 1.75 g of tetracyclododecene as a cycloolefin monomer dissolved in 1.75 g of dichloromethane as a solvent was then added and stirred. Next, 32.9 mg of 3,4-dihydro-2-ethoxy-2H-pyran, which is a cyclic vinyl ether compound, was added as a polymerization initiator, was stirred therewith, and then photoirradiation by an LED lamp (wavelength: 425 nm) was commenced so as to initiate a ring-opening metathesis polymerization reaction. After 15 hours of reaction at room temperature, a large amount of acetone was poured into the polymerization reaction solution containing a ring-opened polymer as a reaction product, precipitate was caused to agglomerate, and agglomerated material containing the ring-opened polymer was filtered off. The filtration cake was washed with methanol and was subsequently dried under reduced pressure at 40° C. for 24 hours. The yield of the obtained ring-opened polymer was 0.11 g. The weight-average molecular weight of the obtained ring-opened polymer, which was measured as previously described, was 3,200. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the 3,4-dihydro-2-ethoxy-2H-pyran serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of tetracyclododecene serving as cycloolefin monomer)+(molecular weight of 3,4-dihydro-2-ethoxy-2H-pyran serving as polymerization initiator). Through these results, the ring-opened polymer obtained in this step was confirmed to be a cyclic polymer.

<Hydrogenation Step>

Next, 0.1 g of the ring-opened polymer obtained in the ring-opening polymerization step (i.e., the cyclic polymer) and 0.8 g of p-toluenesulfonyl hydrazide as a hydrogenating agent were added into a glass reactor equipped with a stirrer. Next, 30 mL of p-xylene was added as a solvent, and a hydrogenation reaction was performed at 125° C. for 5 hours to yield a hydrogenation reaction solution containing a hydrogenated ring-opened polymer (i.e., a hydrogenated cyclic polymer).

<After Treatment Step>

The hydrogenation reaction solution was poured into a large amount of acetone, and the hydrogenated ring-opened polymer obtained through the hydrogenation step was caused to completely precipitate and was then filtered off and washed. Thereafter, the washed filtration cake was dried under reduced pressure at 40° C. for 24 hours. The hydrogenation ratio of the obtained hydrogenated ring-opened polymer, which was measured as previously described, was at least 99%. Moreover, "Product analysis" was performed for the obtained hydrogenated ring-opened polymer as previously described. As a result, it was identified that the obtained hydrogenated ring-opened polymer had a structure including a hydrogenated product of a ring-opened cycloolefin obtained through ring-opening polymerization of a cycloolefin, and also that a vinyl group of the 3,4-dihydro-2-ethoxy-2H-pyran serving as a polymerization initiator had been hydrogenated and an ether moiety of the 3,4-dihydro-2-ethoxy-2H-pyran was retained in the hydrogenated ring-opened polymer. Next, the absolute molecular weight of the hydrogenated ring-opened polymer serving as a measurement sample was measured in a time of flight-mass spectrometer. Mass peaks for polymer chains were confirmed to each have a molecular weight equal to: (multiple of molecular weight of hydrogenated product of tetracyclododecene serving as cycloolefin monomer)+(molecular weight of hydrogenated product of 3,4-dihydro-2-ethoxy-2H-pyran serving as polymerization initiator). Through these results, the hydrogenated ring-opened polymer obtained in this step was confirmed to be a cyclic polymer.

Comparative Example 1

A ring-opening polymerization step, a hydrogenation step, and an after treatment step were performed in the same way as in Example 1 with the exception that 8.85 mg of ethyl propenyl ether, which is a linear vinyl ether compound, was added instead of a cyclic vinyl ether compound as a polymerization initiator. The yield of a ring-opened polymer obtained in the ring-opening polymerization step was 1.0 g. The weight-average molecular weight of the ring-opened polymer obtained in the ring-opening polymerization step, which was measured as previously described, was 44,000. Moreover, "Product analysis" was performed for the obtained ring-opened polymer as previously described. As a result, it was identified that the obtained ring-opened polymer had a structure including a ring-opened cycloolefin obtained through ring-opening polymerization of a cycloolefin and that a vinyl ether moiety of the ethyl propenyl ether serving as a polymerization initiator was retained in the ring-opened polymer. Next, the absolute molecular weight of the ring-opened polymer serving as a measurement sample was measured in a time of flight-mass spectrometer. Mass peaks for polymer chains were confirmed to each have a molecular weight equal to: (multiple of molecular weight of norbornene serving as cycloolefin monomer)+(molecular weight of ethyl propenyl ether serving as polymerization initiator), and thus the ring-opened polymer was confirmed to be a linear polymer. The hydrogenation ratio of a hydrogenated product obtained through the hydrogenation step and the after treatment step was at least 99%. Moreover, a hydrogenated cyclic polymer was not contained among solid content obtained through drying under reduced pressure in the after treatment step, and thus the proportion constituted by a hydrogenated cyclic polymer was 0%.

It can be seen that through each of Examples 1 to 12, a hydrogenated cyclic polymer including a cyclic chain that included a repeating unit of a ring-opened cycloolefin was obtained.

Moreover, it can be seen that through Comparative Example 1, a hydrogenated cyclic polymer could not be obtained in a situation in which a linear vinyl ether compound was used as a polymerization initiator without using a cyclic vinyl ether compound.

INDUSTRIAL APPLICABILITY

According to the present disclosure, it is possible to provide a hydrogenated cyclic polymer having a novel structure. Moreover, according to the present disclosure, it is possible to provide a resin composition that contains this hydrogenated cyclic polymer having a novel structure.

The invention claimed is:

1. A hydrogenated product of a cyclic polymer comprising a cyclic chain including a repeating unit of a ring-opened cycloolefin unit, wherein the cyclic chain of the cyclic polymer includes an ether bond.

2. A method of producing a hydrogenated cyclic polymer comprising:
   a ring-opening polymerization step of performing ring-opening polymerization of at least one cycloolefin monomer in the presence of a cyclic vinyl ether compound to obtain a cyclic polymer including a cyclic chain that includes a repeating unit of a ring-opened cycloolefin; and
   a hydrogenation step of hydrogenating the cyclic polymer to obtain a hydrogenated product of the cyclic polymer.

3. The method of producing a hydrogenated cyclic polymer according to claim 2, wherein the cyclic chain of the cyclic polymer obtained in the ring-opening polymerization step includes an ether bond.

4. A resin composition comprising the hydrogenated product according to claim 1.

* * * * *